United States Patent
Wu

(10) Patent No.: US 9,316,823 B2
(45) Date of Patent: Apr. 19, 2016

(54) SWITCHABLE HIGH AND LOW MAGNIFICATION LIGHTWEIGHT MICROSCOPE LENS STRUCTURE

(71) Applicant: Digilens Co., Ltd., Taipei (TW)

(72) Inventor: Chen-Feng Wu, Taipei (TW)

(73) Assignee: Digilens Co., Ltd., Taipei (TW)

( * ) Notice: Subject to any disclaimer, the term of this patent is extended or adjusted under 35 U.S.C. 154(b) by 0 days.

(21) Appl. No.: 14/509,915

(22) Filed: Oct. 8, 2014

(65) Prior Publication Data

US 2015/0116821 A1    Apr. 30, 2015

(30) Foreign Application Priority Data

Oct. 30, 2013   (CN) .................. 2013 2 0677968 U

(51) Int. Cl.
G02B 21/02 (2006.01)
G02B 13/00 (2006.01)
G02B 21/00 (2006.01)

(52) U.S. Cl.
CPC ............ *G02B 21/025* (2013.01); *G02B 13/001* (2013.01); *G02B 21/0008* (2013.01)

(58) Field of Classification Search
CPC . G02B 21/025; G02B 13/001; G02B 21/0008
USPC ......... 359/380, 656, 661, 672, 673, 675, 811, 359/815, 817, 827, 830; 396/432, 529
See application file for complete search history.

(56) References Cited

U.S. PATENT DOCUMENTS

| | | | |
|---|---|---|---|
| 2,630,631 A * | 3/1953 | McMullen | G01B 9/00 33/1 B |
| 4,190,322 A * | 2/1980 | Wortley | G02B 25/005 359/379 |
| 4,737,016 A * | 4/1988 | Russell | G02B 21/0008 359/801 |
| 6,950,374 B2 * | 9/2005 | McKay | G02B 25/002 359/809 |
| 7,362,519 B2 * | 4/2008 | Sakaki | G02B 7/022 359/811 |
| 7,599,135 B2 * | 10/2009 | Feng | G02B 25/008 359/803 |
| 2002/0044347 A1 * | 4/2002 | Steenblik | G02B 21/0008 359/368 |
| 2004/0032652 A1 * | 2/2004 | Holmes | G02B 25/004 359/408 |
| 2005/0169628 A1 * | 8/2005 | Zhang | G03B 17/00 396/529 |
| 2008/0024738 A1 * | 1/2008 | Nozaki | G02B 13/001 353/101 |
| 2008/0055745 A1 * | 3/2008 | Huang | G02B 25/02 359/811 |
| 2008/0204551 A1 * | 8/2008 | O'Connell | G02B 21/0008 348/79 |
| 2009/0093274 A1 * | 4/2009 | Yamamoto | G02B 13/006 455/566 |
| 2009/0219483 A1 * | 9/2009 | Takanashi | A61B 3/132 351/205 |
| 2012/0262805 A1 * | 10/2012 | Fujii | G02B 13/001 359/740 |
| 2014/0078594 A1 * | 3/2014 | Springer | G02B 7/16 359/672 |

* cited by examiner

Primary Examiner — Frank Font

(57) ABSTRACT

A switchable high and low magnification lightweight microscope lens structure has a first microscope unit, a second microscope unit and a hinge. The first microscope unit has a first microscope lens having a first adhesive piece adhesively attached to an inner side of the first microscope unit with a hole formed through the first adhesive piece. The second microscope unit has a second microscope lens with a magnification higher than that of the first microscope lens having a second adhesive piece adhesively attached to an inner side of the second microscope unit. The hinge has two fixed arms, a pivoting block and a pivoting pin. The fixed arms are formed on and protrude from one edge of the first microscope unit. The pivoting block are formed on and protrudes from one edge of the second microscope unit, and mounted between the fixed arms.

10 Claims, 12 Drawing Sheets

SWITCHABLE HIGH AND LOW MAGNIFICATION LIGHTWEIGHT MICROSCOPE LENS STRUCTURE

BACKGROUND OF THE INVENTION

1. Field of the Invention

The present invention relates to a switchable high and low magnification lightweight microscope lens structure, and more particularly to a microscope lens structure capable of being attached to and combined with a cell phone, a tablet personal computer (PC) or a camera lens for taking and viewing high and low magnification images.

2. Description of the Related Art

Rapid technological developments bring increased convenience to people. Currently, individuals can easily own digital camera equipment, including simple autofocus cameras and complicated single lens reflex cameras. Additionally, picture-taking capabilities are available on almost all cell phones and tablet computers. Therefore, photography has become a commonplace skill for ordinary people everywhere. Above all, smart phones and tablet PCs can function as cameras, phones and message-forwarding equipment and are portable so that images taken can be immediately transmitted to recipients through networks, thereby providing instant uploading of images.

Due to shape, size and weight limits, current digital camera equipment, smartphones and tablet PCs can only be equipped with fixed focus lenses, which work with an embedded image processing technique for zoom-in and zoom-out photography when taking pictures. Also, a telescopic zoom lens can be mounted on a camera for wide-angle zoom-in and zoom-out photography. However, the image processing technique and the telescopic zoom lens only allow cell phones, cameras or tablet computers to zoom in and zoom out for photography while photography involving microscopic images is not available.

In view of the foregoing drawback, the related industry has aggressively invested efforts to develop a solution. As disclosed in Taiwan Utility Model Patent No. M244478, an optional lens module can be easily assembled onto a smartphone for a built-in camera lens to magnify, zoom in or zoom out a view of an object in the absence of a microscopic function. To provide the microscopic function, Taiwan Utility Model Patent No. M444520 discloses a conventional lightweight high magnification microscope lens structure. With reference to FIG. 1, the conventional high magnification microscope lens structure includes a body 51 and a rear cover 52. The body 51 has a high magnification lens mounted through the body 51 in a front-to-rear direction. A portion of the rear cover 52 is pivotally mounted on the body 51 such that the rear cover 52 can be folded back and be superposed on a rear side of the body 51. Hence, the conventional high magnification microscope lens structure can be adhered to and assembled on the camera lens of a smartphone, a camera or a tablet PC for the purpose of providing a microscopic function. As the conventional high magnification microscope lens structure only has a single microscope lens, under the circumstances of teaching or industrial applications demanding lower and higher magnifications, the conventional high magnification microscope lens structure with a single microscope lens fails to meet such demands.

SUMMARY OF THE INVENTION

An objective of embodiments of the present invention is to provide a switchable high and low magnification lightweight microscope lens structure, which can adhesively attach to a lens of a cell phone, a tablet computer or a camera with a high-magnification lens and a low-magnification lens switchable for meeting the needs of taking high or low-magnification microscopic images and serving as a teaching tool in biological observations or enlargement of detailed portions of industrial and commercial products.

To achieve the foregoing objective, the switchable high and low magnification lightweight microscope lens structure has a first microscope unit, a second microscope unit and a hinge.

The first microscope lens is mounted through the first microscope unit in a front-to-rear direction.

The first adhesive piece is adhesively attached to an inner side of the first microscope unit with a hole formed through the first adhesive piece.

The second microscope unit having a second microscope lens is mounted through the second microscope unit in the front-to-rear direction and has a magnification higher than a magnification of the first microscope lens.

The hinge has two fixed arms, a pivoting block and a pivoting pin.

The fixed arms are formed on and protrude from an edge of the first microscope unit.

The pivoting block is formed on and protrudes from an edge of the second microscope unit, and mounted between the fixed arms.

The pivoting pin is mounted through the fixed arms and the pivoting block.

The first microscope unit is pivotable with respect to the second microscope unit, and the inner side of the first microscope unit is superimposable on the inner side of the second microscope unit when the microscope lens structure is in a closed state.

Preferably, the second microscope unit has a second adhesive piece adhesively attached to an inner side of the second microscope unit with a hole formed through the second adhesive piece.

Preferably, the first microscope lens has an inner end recessed outwards for the first adhesive piece to be mounted on the inner end of the first microscope lens, and the second microscope lens has an inner end recessed outwards for the second adhesive piece to be mounted on the inner end of the second microscope lens.

Preferably, the pivoting block is tilted outwards when the microscope lens structure is in a fully open state.

Preferably, when the microscope lens structure is in the closed state, a gap defined between the inner sides of the first microscope unit and the second microscope unit is greater than a height of the first adhesive piece.

Preferably, the first microscope unit is pivotable in a range between 270° and 360° with respect to the second microscope unit.

Preferably, the first microscope unit has an eye-shaped edge portion formed around a peripheral wall of an outer portion of the first microscope unit, and the second microscope unit has a sawtooth-shaped edge portion formed around a peripheral wall of an inner portion of the second microscope unit for the first microscope unit and the second microscope unit to exhibit an appearance of a human eye when the first microscope unit and the second microscope unit are superimposed on each other.

Preferably, the first microscope unit has a strap hole formed on a side edge thereof for a strap to pass through the strap hole, and two ends of the strap are tied to an earphone plug.

Preferably, the first microscope unit has a first corrugated surface formed around an edge surface thereof, the second microscope unit has a second corrugated surface formed around an edge thereof, and a recess is formed in the second corrugated surface.

Preferably, each fixed arm of the hinge has an indentation formed in an inner side thereof, and the pivoting block has two bosses respectively formed on two opposite sides thereof adjacent to the indentations and respectively engaging the indentations of the fixed arms of the hinge.

When used, the switchable high and low magnification lightweight microscope lens structure can be adhesively attached to a lens of a cell phone, a tablet computer or a camera and can be magnification-switchable as follows. After aligned with an optical axis of the lens of the cell phone, the tablet computer or the camera, the first adhesive piece on the inner side of the first microscope unit is adhesively attached to the cell phone, the tablet computer or the camera to observe or take microscopic images with a low magnification. Alternatively, the first adhesive piece can be manually adjusted and adhesively attached to an appropriate location around the lens of the cell phone, the tablet computer or the camera. Then, the second microscope unit is pivoted and aligned with the optical axis of the lens and the focus of the second microscope unit is adjusted to make the picture seen through the lens and the microscope unit clear for the purpose of taking microscopic images with a high magnification.

The microscope lens structure can serve as a teaching tool for biological observation or to enlarge or take microscopic images of detailed portions of industrial and commercial products. Cell phones, tablet computers, and cameras can be used to further instantly transmit the images just taken to any recipient through the Internet by means of the wifi features thereof.

DETAILED DESCRIPTION OF THE INVENTION

Figure 1:
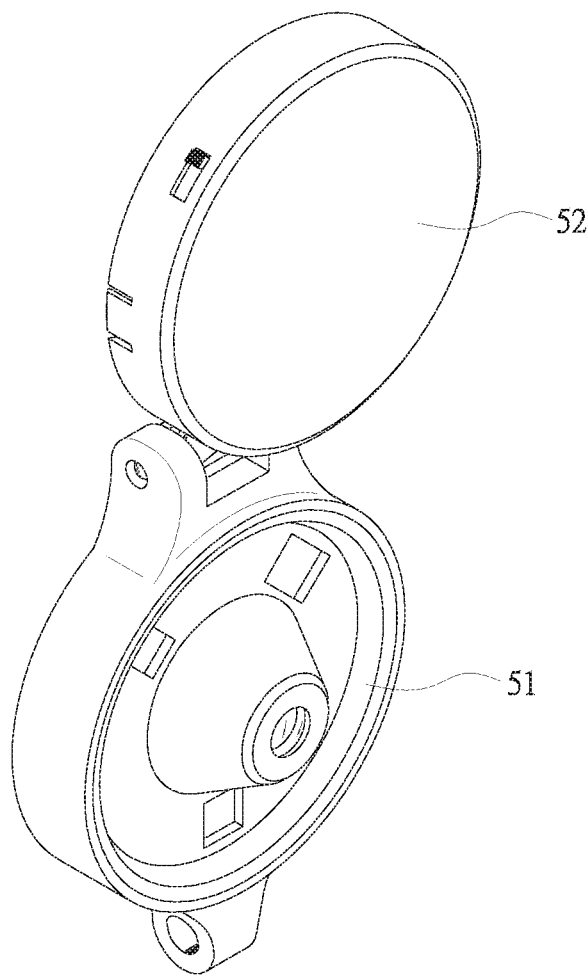
FIG. 1 is a perspective view of a conventional high-magnification lightweight microscope lens structure in an unfolded state.
Figure 2:
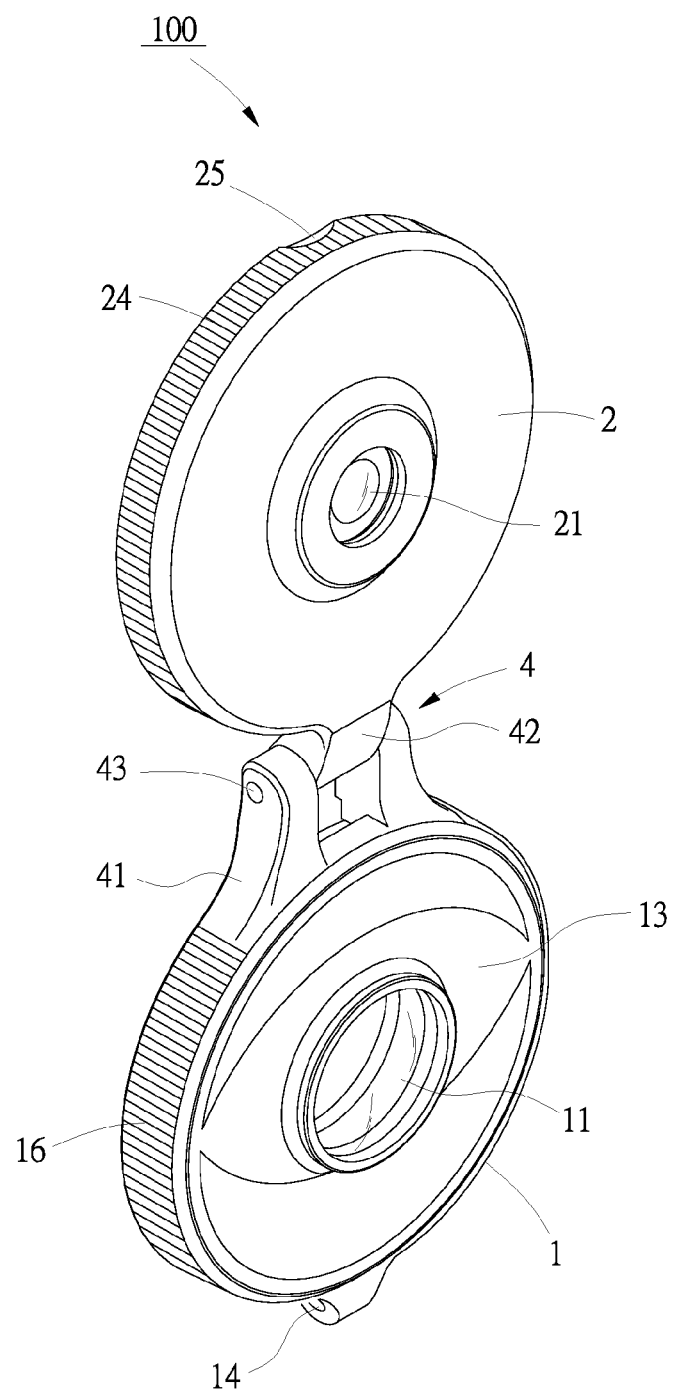
FIG. 2 is a perspective view of a switchable high and low magnification lightweight microscope lens structure in an unfolded state in accordance with an embodiment of the present invention.
Figure 3:
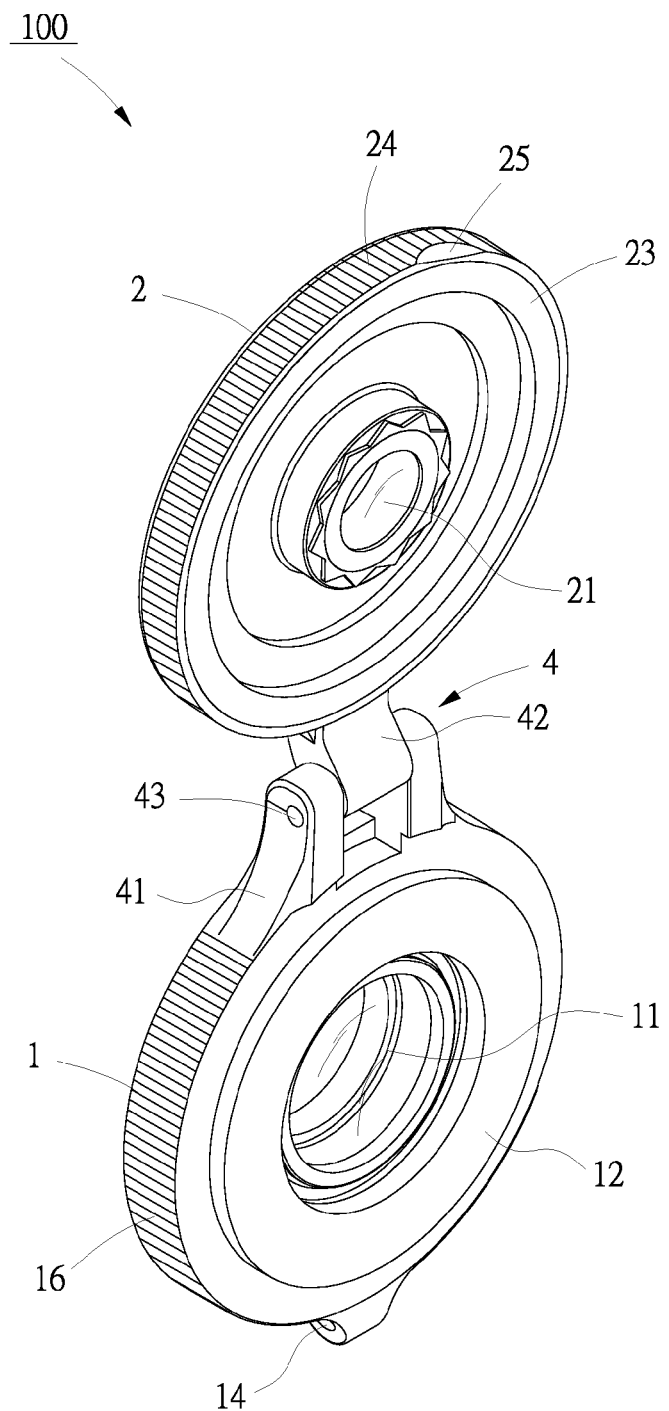
FIG. 3 is a perspective view of another switchable high and low magnification lightweight microscope lens structure in an unfolded state in accordance with an embodiment of the present invention.

With reference to FIGS. 2 and 3, a switchable high and low magnification lightweight microscope lens structure 100 in accordance with an embodiment of the present invention has a first microscope unit 1, a second microscope unit 2 and a hinge 4. The first microscope unit 1 has a first microscope lens 11 and a first adhesive piece 12. The first microscope lens 11 is mounted within the first microscope unit 1 in a front-to-rear direction with an inner end thereof recessed outwards. The first adhesive piece 12 is adhesively attached to an inner side of the first microscope unit 1 and is mounted around the inner end of the first microscope lens 11 with a hole centrally formed through the first adhesive piece 12, and a thickness of the first adhesive piece 12 is greater than a recessed depth of the inner end of the first microscope lens 11. The second microscope unit 2 has a second microscope lens 21 and a second adhesive piece 23. The second microscope lens 21 is mounted within the second microscope unit 2 in the front-to-rear direction with an inner end thereof recessed and extending outwards, and has a magnification higher than that of the first microscope lens 11. The second adhesive piece 23 is securely attached to an inner side of the second microscope unit 2 and is mounted around the inner end of the second microscope lens 21 with a hole centrally formed through the second adhesive piece 23 and a thickness of the second adhesive piece 23 is greater than a recessed depth of the inner end of the second microscope lens 2. The hinge 4 has two fixed arms 41, a pivoting block 42 and a pivoting pin 43. The fixed arms 41 are formed on and protrude from one edge of the first microscope unit 1. The pivoting block 42 is formed on and protrudes from one edge of the second microscope unit 2, and is mounted between the fixed arms 41. The pivoting pin 43 is mounted through the fixed arms and the pivoting block 42 such that the first microscope unit 1 is pivotable with respect to the second microscope unit 2 and the inner side of the first microscope unit 1 is superimposed on the inner side of the second microscope unit 2 to prevent dust from entering the microscope lens structure 100 and prevent the first adhesive piece 12 and the second adhesive piece 23 from losing stickiness. Furthermore, the pivoting block 42 is tilted outwards when the microscope lens structure 100 is in a fully open state, such that the first microscope unit 1 is pivotable in a range between 270° and 360° with respect to the second microscope unit 2.

Figure 4:
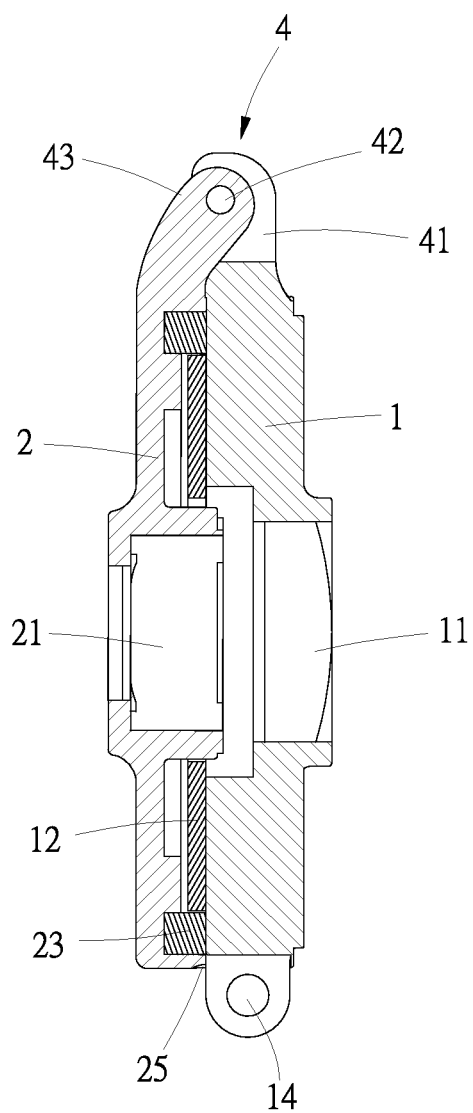
FIG. 4 is a cross-sectional view of the switchable high and low magnification lightweight microscope lens structure of FIG. 2 in a folded state.

With respect to FIG. 4, when the microscope lens structure 100 is in a closed state, a gap defined between the inner sides of the first microscope unit 1 and the second microscope unit 2 is greater than a height of the first adhesive piece 12 mounted on the inner side of the first microscope unit 1 such that the first microscope unit 1 and the second microscope unit 2 will not contact the first adhesive piece 12 when both are superimposed on each other. An outer diameter of the first adhesive piece 12 is slightly less than an inner diameter of the second adhesive piece 23 mounted on the inner side of the second microscope unit 2 such that the first adhesive piece 12 and the second adhesive piece 23 will not contact each other when the first microscope unit 1 and the second microscope unit 2 are superimposed on each other.

Figure 5:
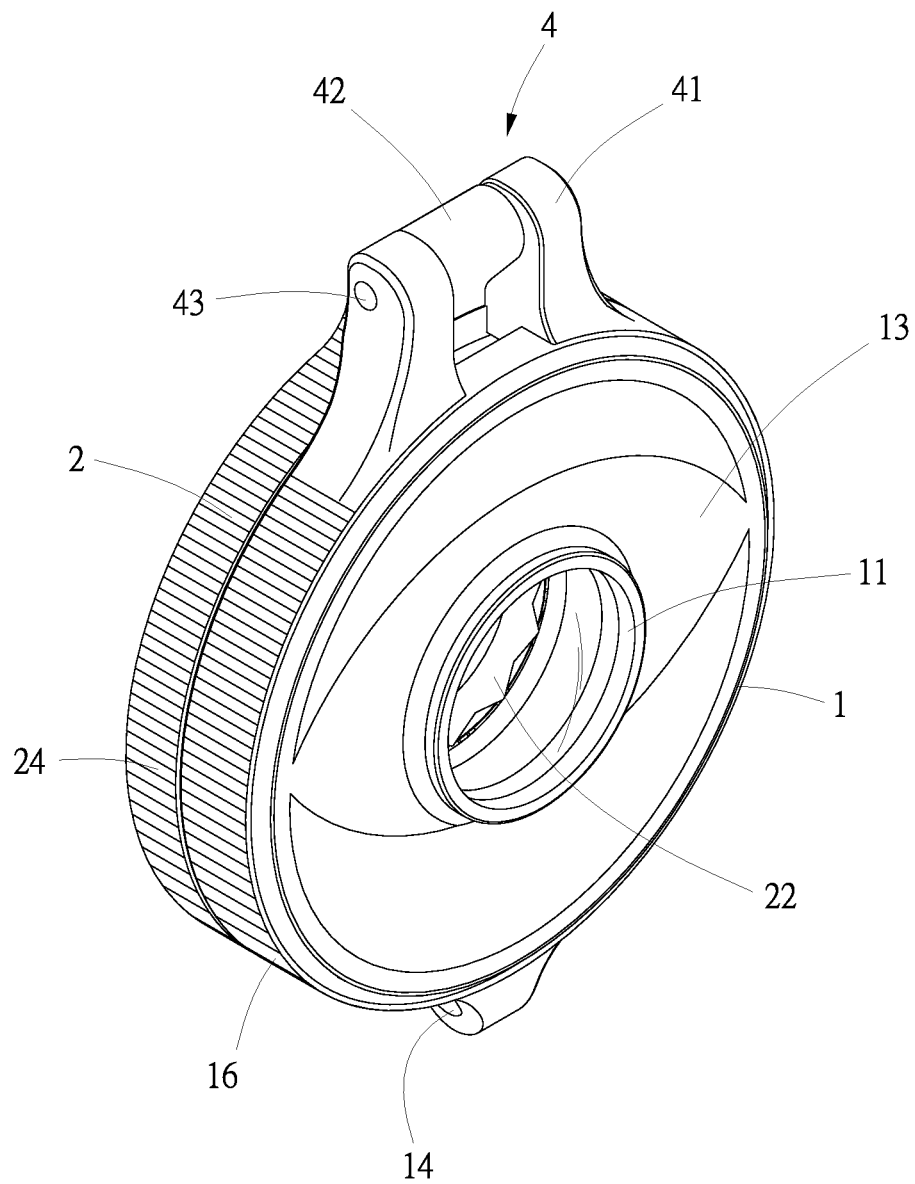
FIG. 5 is a perspective view of the switchable high and low magnification lightweight microscope lens structure of FIG. 2 in a folded state.
Figure 6:
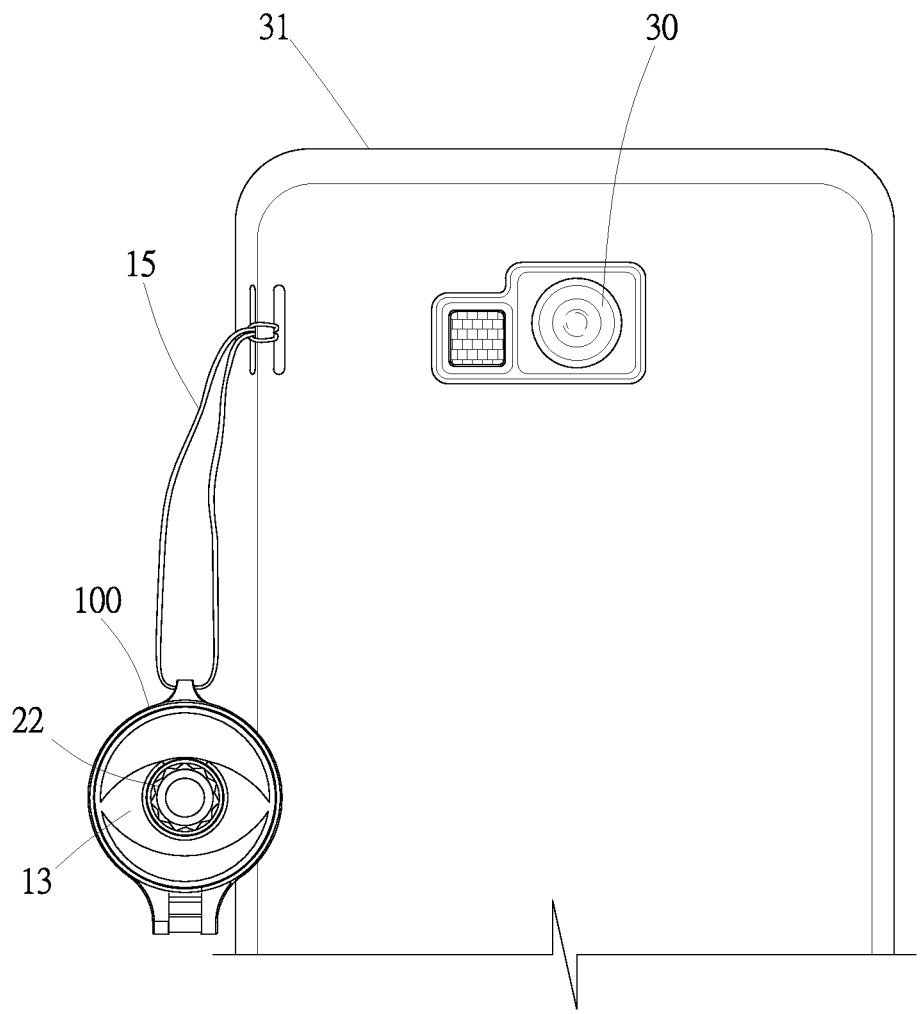
FIG. 6 is a schematic view of the switchable high and low magnification lightweight microscope lens structure of FIG. 2 disposed on a cell phone strap.

With reference to FIGS. 5 and 6, the first microscope unit 1 has an eye-shaped edge portion 13 formed around a peripheral wall of an outer portion of the first microscope unit 1, and the second microscope unit 2 has a sawtooth-shaped edge portion 22 formed around a peripheral wall of an inner portion of the second microscope unit 2 for the first microscope unit 1 and the second microscope unit 2 to exhibit an appearance of a human eye when the first microscope unit 1 and the second microscope unit 2 are superimposed on each other. The first microscope unit 1 has a strap hole 14 for a strap 15 to be mounted there through such that the microscope lens structure 100 can be hung on a cell phone 31.

Figure 7:
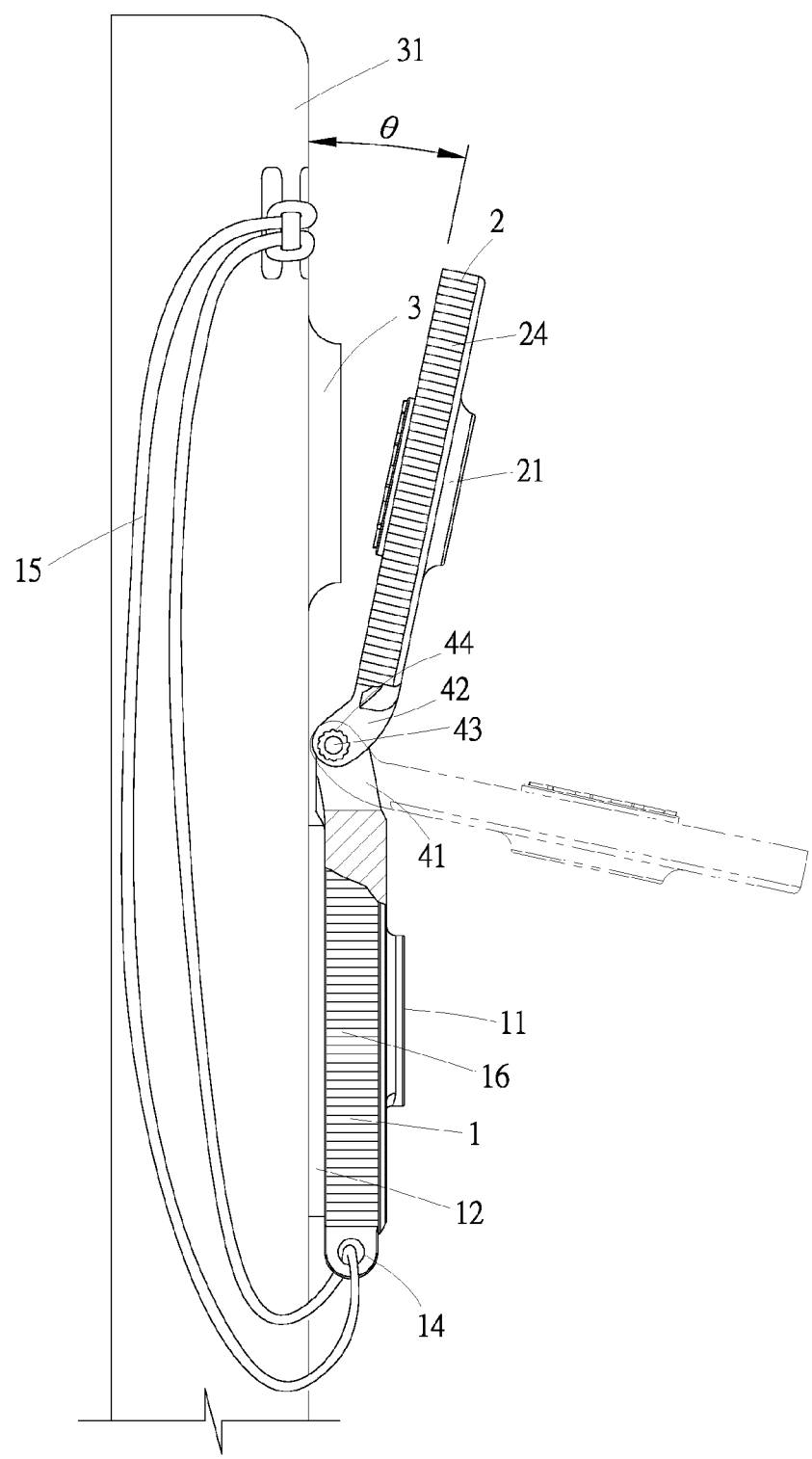
FIG. 7 is an operational side view of the switchable high and low magnification lightweight microscope lens structure of FIG. 2 mounted on a cell phone.

With reference to FIG. 7, when the microscope lens structure 100 is mounted on a camera 31, to manually switch from the first microscope unit 1 to the second microscope unit 2, the first adhesive piece 12 of the first microscope unit is manually attached to an appropriate portion around a lens 30 of the camera 31 at the user's discretion, and the second microscope unit 2 is pivoted up and is aligned in a direction with an included angle between the second microscope unit 2 and the lens 30, and the focus of the second microscope lens 21 is adjusted and an optical axis of the second microscope lens 21 is aligned with that of the lens 30 to make an image seen through the lens 30 and the second microscope lens 21 clear. The second microscope unit 2 can be pivoted in a continuous stageless manner, which can be achieved by a ratchet mechanism 44. When the second microscope unit 2 is not used, the second microscope unit 2 is pivoted down for the optical axis of the second microscope unit 2 to be misaligned with that of the lens 30 of the camera such that the lens 30 of the camera 31 restores the original image-taking functions thereof.

Figure 8:
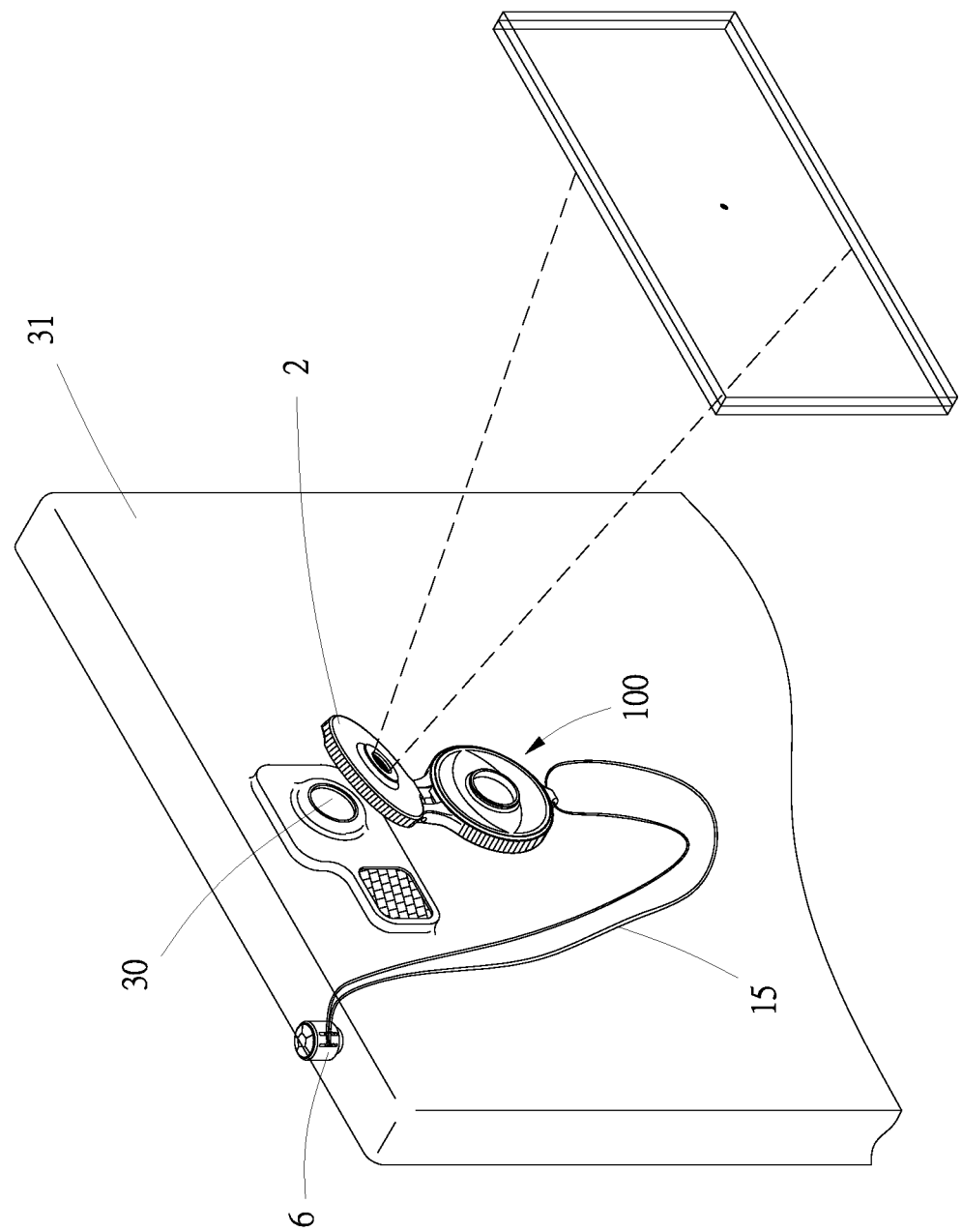
FIG. 8 is an operational perspective view of the switchable high and low magnification lightweight microscope lens structure of FIG. 2 mounted on a cell phone.
Figure 9:
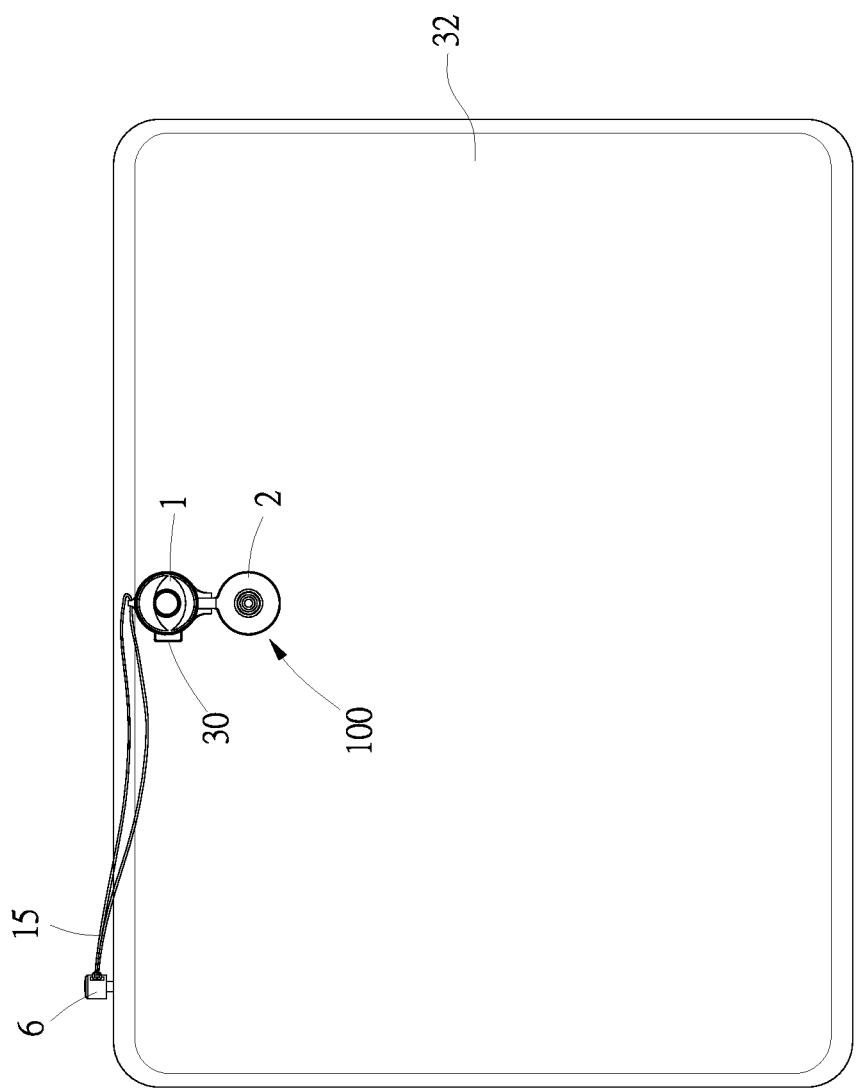
FIG. 9 is an operational front view of the switchable high and low magnification lightweight microscope lens structure of FIG. 2 mounted on a tablet computer.
Figure 10:
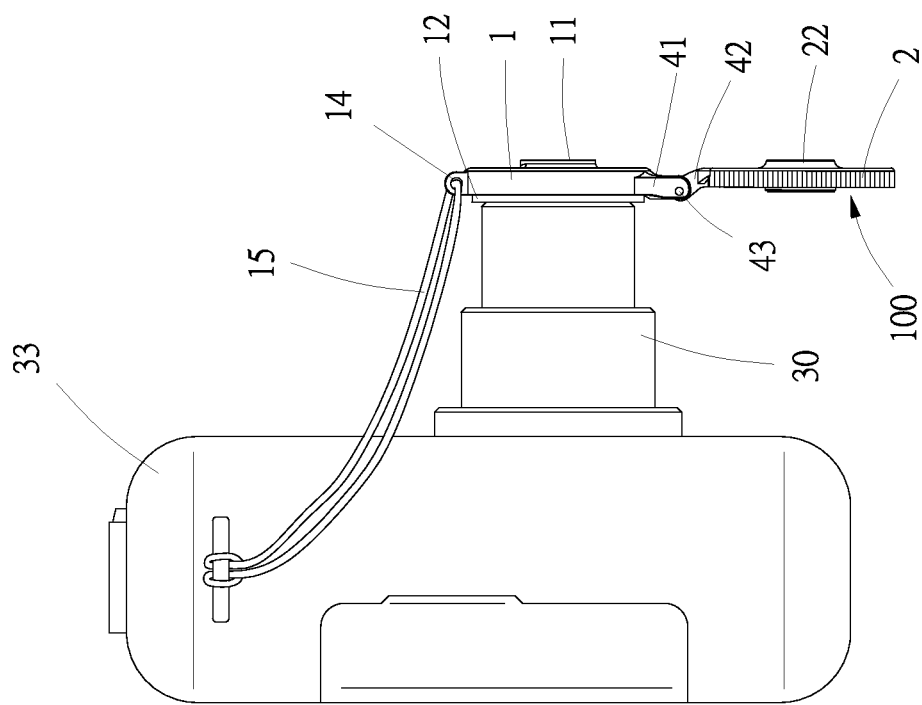
FIG. 10 is an operational perspective view of the switchable high and low magnification lightweight microscope lens structure of FIG. 2 mounted on a camera.
Figure 11:
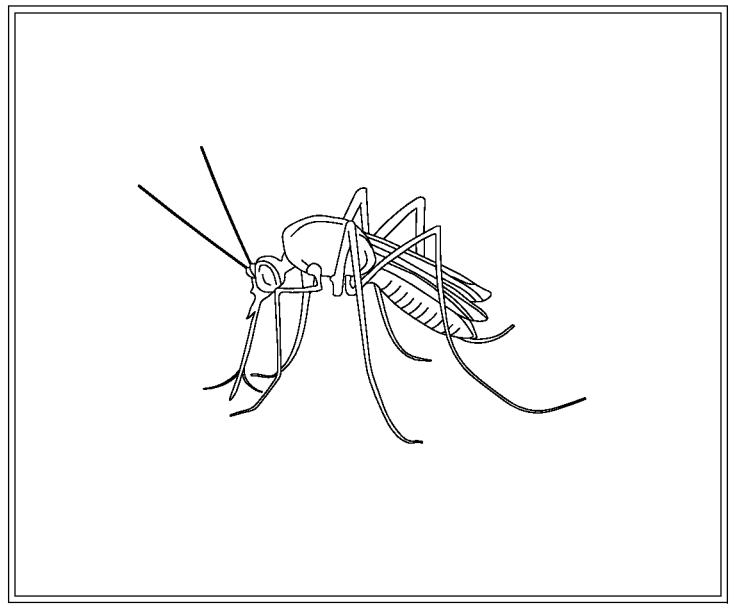
FIG. 11 is a schematic view of a picture of a mosquito taken by a cell phone through the switchable high and low magnification lightweight microscope lens structure of FIG. 2.

With reference to FIGS. 8-11, the microscope lens structure 100 is respectively and adhesively combined with a lens 30 of a cell phone 31, a tablet computer 32 or a camera 31 through the use of the second adhesive piece 12. Then, the second microscope unit 2 is pivoted toward the lens 30 of the camera 31, the focus of the second microscope lens 21 is adjusted, and an optical axis of the second microscope lens 21 is aligned with that of the lens 30 to observe or take a microscopic image with a relatively higher magnification, as shown in FIG. 8. Alternatively, the first adhesive piece 12 of the first microscope unit 1 is aligned with the lens 30 of the tablet computer 32 or a camera 33 as shown in FIGS. 9 and 10 to observe or take a microscopic image with a relatively lower magnification as shown in FIG. 11.

With further reference to FIGS. 8-10, the first microscope unit 1 has a strap hole 14 formed on a side edge thereof for a strap 15 to pass there through such that two ends of the strap 15 are tied to an earphone plug 6 that is directly inserted into the cell phone 31 or the tablet computer 32, as shown in FIGS. 8 and 9, or are tied to a housing of the camera 33, as shown in FIG. 10. Accordingly, the microscope lens structure 100 can be carried along and used, and has a structure suitable for the use in regular cell phones, tablet computers and cameras, thus increasing the enjoyment of image taking without giving rise to additional costs or introducing problems associated with the original image-taking operations.

To facilitate opening and closing of the microscope lens structure 100, the first microscope unit 1 has a first corrugated surface 16 formed around a circumferential edge thereof, and the second microscope unit 2 has a second corrugated surface 24 formed around a circumferential edge thereof, and a recess 25 is formed in the second corrugated surface 24. Given the abrasive contact of the first corrugated surface 16 and the second corrugated surface 24, and the point of force application on the recess 25, users can open and close the microscope lens structure 100 more easily and conveniently.

Figure 12:
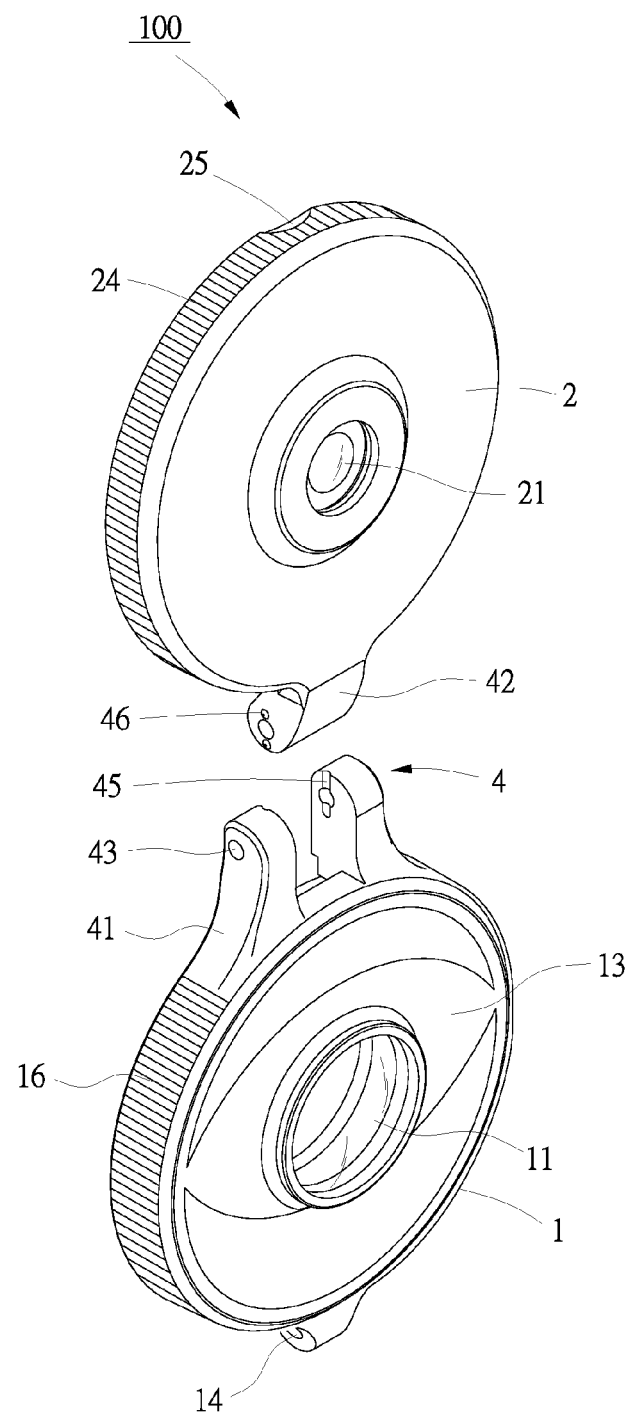
FIG. 12 is a partial exploded perspective view showing a hinge of the switchable high and low magnification lightweight microscope lens structure of FIG. 2.

With reference to FIG. 12, each fixed arm 41 of the hinge 4 has an indentation 45 formed in an inner side thereof. The pivoting block 42 has two bosses 46 respectively formed on two opposite sides thereof adjacent to the indentations 45 and respectively engaging the indentations 45 on the fixed arms 41. When the first microscope unit 1 is pivoted up to 180° with respect to the second microscope unit 2 to open the microscope lens structure 100, the indentations 45 and the bosses 46 position and limit further movement of the first microscope unit 1 and the second microscope unit 2.

Given the first microscope unit 1 and the second microscope unit 2 respectively having a low-magnification lens and a high-magnification lens for taking microscopic images, the microscope lens structure 100 can serve as a teaching tool for biological observations or for the use of enlarging or taking microscopic images of detailed portions of industrial and commercial products. Cell phones, tablet computers, and cameras can be used to further instantly transmit the images just taken to any recipient through the Internet by means of the WiFi feature thereof.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A switchable higher and lower magnification microscope lens structure, comprising:
   a first microscope unit having:
      a first microscope lens mounted through the first microscope unit in a front-to-rear direction; and
      a first adhesive piece adhesively attached to an inner side of the first microscope unit with a first hole formed through the first adhesive piece;
   a second microscope unit having a second microscope lens mounted through the second microscope unit in the front-to-rear direction and having a magnification higher than a magnification of the first microscope lens; and
   a hinge having:
      two fixed arms formed on and protruding from an edge of the first microscope unit;
      a pivoting block formed on and protruding from an edge of the second microscope unit, and mounted between the fixed arms; and
      a pivoting pin mounted through the fixed arms and the pivoting block;
   wherein the first microscope unit is pivotable with respect to the second microscope unit, and the inner side of the first microscope unit is superimposable on an inner side of the second microscope unit when the microscope lens structure is in a closed state.

2. The microscope lens structure as claimed in claim 1, wherein the second microscope unit has a second adhesive piece adhesively attached to the inner side of the second microscope unit with a second hole formed through the second adhesive piece.

3. The microscope lens structure as claimed in claim 2, wherein the first microscope lens has an inner end recessed outwards for the first adhesive piece to be mounted on the inner end of the first microscope lens, and the second microscope lens has an inner end recessed outwards for the second adhesive piece to be mounted on the inner end of the second microscope lens.

4. The microscope lens structure as claimed in claim 2, wherein the pivoting block is tilted outwards when the microscope lens structure is in a fully open state.

5. The microscope lens structure as claimed in claim 3, wherein when the microscope lens structure is in the closed state, a gap defined between the inner sides of the first microscope unit and the second microscope unit is greater than a height of the first adhesive piece.

6. The microscope lens structure as claimed in claim 5, wherein the first microscope unit is pivotable in a range between 270 and 360° with respect to the second microscope unit.

7. The microscope lens structure as claimed in claim 1, wherein the first microscope unit has an eye-shaped edge portion formed around a peripheral wall of an outer portion of the first microscope unit, and the second microscope unit has a sawtooth-shaped edge portion formed around a peripheral wall of an inner portion of the second microscope unit for the first microscope unit and the second microscope unit to exhibit an appearance of a human eye when the first microscope unit and the second microscope unit are superimposed on each other.

8. The microscope lens structure as claimed in claim 7, wherein the first microscope unit has a strap hole formed on a side edge thereof for a strap to pass through the strap hole, and an end of the strap is tied to an earphone plug.

9. The microscope lens structure as claimed in claim 8, wherein the first microscope unit has a first corrugated surface formed around an first edge surface of the first microscope unit, the second microscope unit has a second corrugated surface formed around second edge of the second microscope unit, and a recess is formed in the second corrugated surface.

10. The microscope lens structure as claimed in claim 1, wherein each fixed arm of the hinge has an indentation formed in an inner side of the fixed arm, and the pivoting block has two bosses respectively formed on two opposite sides of the pivoting block adjacent to the indentations and respectively engaging the indentations of the fixed arms of the hinge.

* * * * *